2,723,294

PREPARATION OF POLYMERIZATION PRODUCTS FROM PROPENE AND PENTENE OXIDES

George J. Benoit, Jr., San Anselmo, Calif., assignor to California Research Corporation, San Francisco, Calif., a corporation of Delaware No Drawing. Application May 29, 1950,
Serial No. 165,103

4 Claims. (Cl. 260—615)

This invention relates to the preparation of polymerization products from alkene oxides, and more particularly to the preparation of useful copolymerization products from an alcohol and a mixture of alkene oxides containing propene oxide and the pentene oxides, including the isopentene oxides, and cyclopentene oxide.

Mixtures of polyoxyalkene monohydroxy compounds resulting from the reaction under pressure of monohydroxy aliphatic alcohols with alkene oxide mixtures consisting of ethene oxide and propene oxide in certain ratios have been prepared. These products may be characterized as aliphatic mono-ethers of polyoxyalkene glycols of the formula $R \cdot (OC_nH_{2n})_xOH$, wherein R represents an alkyl group derived from the alcohols; O, oxygen; H, hydrogen; X, the total number of oxyethene and oxypropene groups derived from ethene oxide and propene oxide, equal to the sum of the mols of ethene and propene oxide employed in the reaction.

Dihydroxy polyoxyalkene glycols or di-ols of relatively high average molecular weight prepared from mixtures of ethene oxide and propene oxide are also known in the prior art.

It is also known that the polymerization products hereinabove mentioned have been proposed as synthetic lubricants. Such compounds, however, possess certain disadvantages which detract from their usefulness, particularly when employed to lubricate metal surfaces, for example, when employed as crankcase lubricants in internal combustion engines. An example of a disadvantage inherent in ethene and propene oxide polymers as crankcase lubricants is the high affinity thereof for water.

While miscibility with water may be a desirable property of the polymer for certain uses, for example when used as water solutions in textile lubrication, yet such a property is objectionable in applications wherein the absence of water is desired. For example, water miscibility of the polymer is objectionable when the polymer is to be used as a crankcase lubricant. Because of the affinity of the polymer for water, water dissolves in the polymer, thereby promoting rusting of metallic surfaces, with the result that the polymer is either unsuitable for use as a crankcase lubricant or requires the use of large amounts of an anti-rusting agent to inhibit deterioration of the metal.

An additional disadvantage of the water affinity of the ethene and propene oxide polymers is the adverse effect on yield. The preparation of the polymeric materials includes a water washing treatment to rid the reaction products of water-soluble impurities, a treatment which results in loss of polymer dissolved in the removed wash water, with a consequent reduction in yield.

While the aforesaid polymeric materials exhibit relatively high affinity for water, they conversely manifest poor miscibility with various organic solvents, such as hydrocarbon oils used as lubricants in internal combustion engines. When formed into mixtures with such solvents, the mixture is heterogeneous and the polymers separate out at relatively high temperatures. Thus the lower end of the range of temperatures that may prevail in an engine crankcase, that is at about 100° F. and lower, the polymer and oil are immiscible.

One method of preparing polymers from olefin oxides and an alcohol is to subject the oxides and alcohol to polymerizing conditions of pressure and temperature in the presence of an alkaline catalyst, for example, sodium or potassium hydroxide.

While basic catalysts are quite effective in promoting the polymerization reaction, it has been found that products resulting from such reaction are not always satisfactory. Often the products possess an objectionable dark or brown color difficult to remove. At other times the reaction products are not only inferior because of undesirable discoloration, but develop objectionable phase separation as shown by the presence of a sediment or haze, indicating that undesirable side reactions have occurred during polymerization.

I have found that I may prepare a superior product free of the foregoing objectionable properties by employing a minimum amount of catalyst. An amount of catalyst not more than about 1 mol per 100 mols of the propene and pentene oxides, and less, assures the formation of an improved product. As will hereinafter appear, I have found that the polymerization reaction proceeds smoothly and with ease in the presence of minor amounts of alkaline catalyst by employing the aforesaid oxides in certain proportions or ratios which are critical to the carrying out of the reaction.

An object of the invention is to prepare new polymeric materials.

A further object of the invention is to prepare alkene oxide polymers in increased yields.

Another object of the invention is to prepare polyoxyalkene polymers which are miscible with a number of solvents over a wide temperature range.

Still another object of the invention is to prepare alkene oxide polymers having little affinity for water.

Yet another object of the invention is to prepare alkene oxide polymers having superior non-rusting characteristics.

Another object of the invention is to prepare polymeric materials from propene and pentene oxides free from objectionable color characteristics and phase separation.

Other objects and advantages of the invention will be apparent from the ensuing description of the invention.

Broadly, the present invention contemplates the preparation of polymerization products from an alcohol, preferably a monohydroxy aliphatic alcohol, and a mixture of alkene oxides containing propene oxide (1,2-epoxypropane), and at least one oxide of the group of pentene oxides, subjected to polymerization conditions of temperature and pressure, in the presence of a small amount of catalyst, the aforesaid oxides being present in the alkene oxide mixture in certain critical proportions or ratios. As used in the specification and in the claims, the term "pentene oxides" is intended to include the pentene oxides, 1-2-epoxypentane, and 2,3-epoxypentane; and the isopentene oxides, 2-methyl-1,2-epoxybutane, 2-methyl-2,3-epoxybutane, 3-methyl-1,2-epoxybutane, and 1,2-epoxycyclopentane.

I have found that the shortcomings hereinabove mentioned of prior art polymers may be overcome by the present invention. The alcohol-initiated polymerization of the alkene oxide mixture above mentioned results in a polymeric mixture superior as a synthetic lubricant to that prepared from propene oxide alone or a mixture thereof with ethene oxide. Thus, by means of the invention it is possible to utilize relatively abundant propene oxide to prepare a far better lubricant for internal combustion engines than is possible by the polymerization of propene oxide alone or in a copolymerization thereof with ethene oxide. The use of the pentene oxides on the other hand makes possible the preparation of a polymer having greater solubility in mineral oil, lower water solubility, both of the polymer in water and of water in the polymer, as a result of which the polymer has superior anti-rusting characteristics when used as a lubricating oil; and, also, a polymer of lower density, an important property in aviation engine lubrication.

In general, the polymerization reaction is effected by a process which comprises bringing the mixture of monomeric oxides into intimate contact with a small amount of a suitable catalyst, such as an alkali metal hydroxide or alcoholate, in a reaction zone, and in the presence of an alcohol effective to initiate the polymerization reaction. It is sometimes desirable to employ an inert organic diluent for the reaction mixture, for example, dibutyl ether, in which case the catalyst and alcohol may be suspended therein to form a slurry. The use of a diluent is not essential, however, and the alcohol initiator employed to initiate the polymerization reaction may be used in place thereof or in combination therewith as carrier for the catalyst.

Polymerization is effected by subjecting the reactants to polymerizing conditions of temperature and pressure. At the completion of the reaction the catalyst may be removed by water washing, and the diluent, if present, by distilling under vacuum. Further purification of the polymer, if desired, may be effected by methods well known in the art, such as stripping of light ends under reduced pressure. The polymer may also be fractionated by molecular distillation.

In effecting the polymerization reaction in accordance with the procedure described above, and hereinafter to be more fully described, I have found that the mixture of the monomer oxides of propene oxide ($C_3$ oxide) and the pentene oxides ($C_5$ oxides) is critical in regard to the relative proportions of the aforesaid monomer oxides contained therein. That is, I have found that the amounts of the $C_5$ oxides that are employed in combination with the $C_3$ oxide in accordance with the invention must be present in certain relative amounts or proportions. Below a certain minimum concentration of $C_3$ oxide and above a certain maximum concentration of the $C_5$ oxides in the reaction mixture, a rapidly decelerating rate of reaction sets in, with the result that the rate of reaction after some time becomes impracticably low, and the reaction is not carried to completion.

It has been found that the effect on the polymerization reaction of the various alkene oxides varies with the concentration of the types of alkene oxides present in the alkene oxide mixture, and that in order to carry out the reaction the various types of alkene oxides must be present within certain critical concentrations, as will hereinafter more fully appear.

For purposes of classification, I have found that the types of alkene oxides may be distinguished by their "degree of substitution." I have discovered that on the basis of their degree of substitution, alkene oxides follow a definite reaction pattern, and that oxides characterized by a like degree of substitution behave similarly in the polymerization reaction.

The term "degree of substitution" of a given oxide is arrived at by arbitrarily regarding the oxides as derivatives of ethylene oxide obtained by the substitution of hydrogen atoms of ethylene oxide with carbon atoms, and indicates the number of hydrogen atoms of ethylene oxide substituted by carbon atoms to give the higher alkene oxides. Thus, in accordance with the foregoing definition, ethylene oxide itself has a degree of substitution of 0; propylene oxide, 1,2-epoxypentane, and 3-methyl-1,2-epoxybutane, a degree of substitution of 1; 2,3-epoxypentane, 2-methyl-1-, 2-expoxybutane and 1,2-epoxcyclopentane, a degree of substitution of 2; and 2-methyl-2,3-epoxybutane, a degree of substitution of 3.

The reaction proceeds with greatest ease and gives rise to improved products when the mixture of alkene oxide reactants contains a minimum of about 70 mol per cent propene oxide; not more than about 15 mol per cent, preferably not more than 10 mol per cent, of degree 2 substituted material, that is, 2,3-epoxypentane, 2-methyl-1,2-epoxybutane and 1,2-epoxycyclopentane; not more than about 5 mol per cent, preferably none, of the degree 3 substituted material, 2-methyl-2,3-epoxybutane; and the remainder, the degree 1 substituted 1,2-epoxypentane and/or 3-methyl-1,2-epoxybutane. In general, the alkene oxide mixture contemplated by the present invention contains from about 70 to about 90 mol per cent propene oxide, and 10 to 30 mol per cent pentene oxides, the degree 2 substituted pentene oxides, and the degree 3 substituted oxide content of said pentene oxides being not more than 15 mol per cent, and 5 mol per cent, respectively.

It has been found that a minimum $C_3$ oxide concentration of about 70 mol per cent is essential for the proper carrying out of the reaction. It has also been found that concentrations of degree 2 substituted oxides in excess of about 15 mol per cent and of degree 3 substituted oxide in excess of about 5 mol per cent give rise to a low degree of polymerization. Below a concentration of about 10 mol per cent of any suitable $C_5$ oxide or mixture of $C_5$ oxides, the oil miscibility temperature of the polymer remains undesirably high, a concentration of about 10 mol per cent of the $C_5$ oxide content being required to prepare polymeric mixtures completely miscible with medicinal white oil at a temperature of around 100° F. when using methanol as the reaction initiator and in preparing a synthetic lubricant of about SAE 20 viscosity grade. As hereinafter more fully described, oil miscibility temperature of a polymer of given average molecular weight may advantageously further be lowered by employing a higher alcohol as the polymerization reaction initiator and/or a higher proportion of $C_5$ oxides in the $C_3$—$C_5$ olefin oxide reaction mixture. The oil miscibility temperature increases with increasing molecular weight for a given alcohol and a given concentration of $C_5$ oxides.

By oil miscibility temperature it is intended to mean the lowest temperature at which complete miscibility occurs when equal volumes of polymer and hydrocarbon oil are mixed. The hydrocarbon oil hereinabove referred to and that of the example hereinafter appearing was medicinal white oil. Medicinal white oil was selected as the standard solvent because of its uniformity and availability. This oil is a highly refined hydrocarbon obtained from a phenol raffinate exhaustively acid treated with 115 per cent fuming sulfuric acid. The final product has a 100 per cent unsulfonated residue in accordance with ASTM D-483-40 and a viscosity of about 350 SSU at 100° F.

The polymerization of $C_3$ and $C_5$ oxides contemplated by the invention results in a mixture of relatively high molecular weight compounds of varying chain length and of varying internal molecular configuration, depending on the number, nature and relative proportion of the oxy groups present in the chain, and the mol ratio of oxides to alcohol employed to initiate the polymerization reaction.

The various chains, containing oxyalkene groups derived from the aforesaid oxides, may be illustrated by the formula:

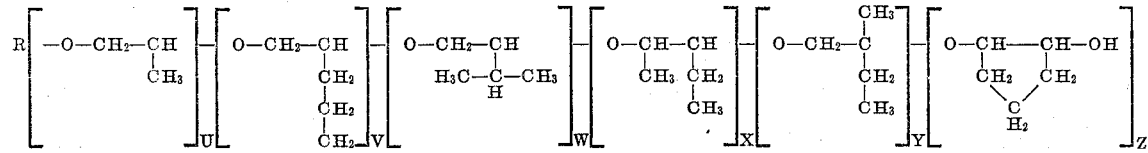

wherein the various oxy groups, reading from left to right, represent oxy groups derived from 1,2-epoxypropane, 1,2-epoxypentane, 3-methyl-1,2-epoxybutane, 2,3-epoxypentane, 2-methyl-1,2-epoxybutane, and 1,2-epoxycyclopentane; R is an alkyl group derived from a monohydroxy alcohol employed to initiate the polymerization reaction; the hydroxyl group is derived from the alcohol; and the letters U, V, W, X, Y and Z represent whole numbers including zero for V, W, X, Y or Z except as indicated above, indicating the number of oxy building unit groups, or monomeric units, in the polyoxalkene chain. It will be understood by those skilled in the art that the order of the groups is essentially random, and that the groups do not follow in an orderly sequence; this gives rise to numerous permutation possibilities. In the event a polyhydroxy alcohol is used as the reaction initiator, hydroxy groups appear at the ends of the chain, and residue of the alcohol within the chain.

Suitable reaction initiating substances are aliphatic, alicyclic and aromatic alcohols, such as primary, secondary, or, less preferably, tertiary alcohols, phenols and naphthols; certain heterocyclic alcohols may also be used to advantage. Normal and branched chain alcohols, and substituted alcohols, such as ether alcohols, are also satisfactory. Dihydric alcohols, such as ethylene glycol, propylene glycol, diethylene glycol, dipropylene glycol, the butylene glycols, including 1,2-, 1,3-, 1,4- and 2,3-butane diols, and 2-methyl-1,2(or1,3)-propane-diol, and similar compounds may be used, although less desirably. Polyhydric alcohols, such as glycerol, trimethylolmethane, pentaerythritol, sorbitol, mannitol, etc., are also not precluded. In general alcohols can be employed ranging from one carbon atom to about 30 carbon atoms in the molecule.

It is preferred, however, to employ monohydroxy aliphatic alcohols, and most advantageously alcohols having one to about 10 carbon atoms in the molecule.

Examples of the prefered alcohols are methanol, ethanol, isopropyl alcohol, propanol, butanol, isobutyl alcohol, 2-butanol, pentanol, secondary butyl carbinol, isobutyl carbinol, diethyl carbinol, hexanol, methylpentanol, 2-ethylbutanol, the various heptanols, 2-ethylhexanol, octanol, 2-octanol, decanol, and other alcohols having 10 carbon atoms or less produced by the OXO reaction. Other examples of alcohols containing more than 10 carbon atoms in the molecule are 5-ethyl-2-nonanol, trimethylnonanol, 7-ethyl-2-methyl-4-undecanol, lauryl, myristyl, cetyl and octadecyl alcohols, and certain alcohols prepared by the OXO reaction.

Five-membered ring cyclic alcohols such as cyclopentanol and tetrahydrofurfuryl alcohol may be employed to advantage.

Unsaturated alcohols such as allyl, furfuryl, methallyl, propargyl, undecylenyl, and oleyl alcohols may also be used.

For certain applications aryl aliphatic alcohols such as benzyl, phenylethyl and phenylcyclohexyl alcohols are useful.

In general, the use of dihydric or polyhydric alcohols are less desirably used since the use thereof results in polymer diol or polyol chains having two or more terminal hydroxyl groups, which have greater affinity for water and lower oil solubility than the monoether derivatives, and also have lower viscosity indices than the monoethers. It has also been found that aromatic hydroxyl-containing substances are not particularly desirable in that they tend to produce an inferior synthetic lubricant of reduced viscosity index.

The polymerization reaction is carried out in a confined reaction zone or closed system. A suitable reactor is an autoclave having suitable means of heating and agitating, such as a stirrer or shaker, to provide for intimate admixture of reactants.

In carrying out the polymerization reaction to prepare polymerization products suitable for use as lubricants, it is desirable that the reaction proceed under substantially anhydrous conditions. The absence of moisture during the polymerization reaction results in a more stable and purer product for lubricating purposes. The mixture of alkene oxides, alcohol, catalyst, and reactor may all be dried in conventional manner prior to the reaction.

Examples of suitable catalysts are the alkali metal hydroxides, such as sodium hydroxide, lithium hydroxide and potassium hydroxide; the alkali metal alcoholates, etc. The amount of polymerization catalyst, based on, or expressed in terms of mol ratio of olefin oxides to catalyst, varies from as much as 100 mols of oxides to 1 of catalyst, to as little as 700 mols of oxides to 1 mol of catalyst. The preferred ratio of oxides to catalyst is 200–400 mols of oxides to 1 mol of catalyst.

Although a solvent or diluent for the reactants and reaction products is not essential, a diluent inert to the reactants can be used. Suitable solvents may be aliphatic and armotic hydrocarbons, and ethers; for example, petroleum ether, benzene, xylene, ethyl benzene, dibutyl ether, etc. Also suitable as diluent is preformed polymer. In practicing the invention, the amount of solvent may vary widely, an amount sufficient to form a slurry with the catalyst being satisfactory.

Reaction temperatures are maintained sufficiently high to promote the polymerization reaction at a reasonable rate. Temperatures of about 175° F. to about 325° F. may be employed; in most cases a temperature between about 210° F. and about 300° F. produces good results.

Pressures in the reaction zone may vary widely. Thus, pressures in the reaction zone may vary from about 5 pounds per square inch, and pressures as high as about 200 pounds per square inch may be used. The pressure in the reactor is preferably maintained by building up a concentration of unreacted monomer mixture in the reactor, which mixture is introduced therein in such manner as to maintain the pressure rather constant or uniform, that is, with not more than about 5 pounds per square inch variation. It is advantageous, however, not to have too great an excess of unreacted monomers present during the polymerization reaction, since large amounts thereof impair the efficiency of the reaction, and create operating hazards, such as the danger of explosion. In effecting the desired pressure in the reaction zone, therefore, an inert material, such as nitrogen, may be employed together with the concentration of unreacted monomer mixture to build up the desired pressure.

Prior to initiating the polymerization reaction, it is advantageous to remove the oxygen from the reactor, the presence of which causes undesirable oxidation products. In removing the oxygen, the preferred procedure is to charge the autoclave with catalyst and alcohol, then flush the same with nitrogen, in which case nitrogen may be employed, together with the mixture of unreacted alkene oxides to build up the desired pressure in the reaction zone, and to decrease the concentration of unreacted monomers therein. Following the removal of oxygen, the oxygen-free reactor containing the catalyst and alcohol is heated to reaction temperatures, following which the mixture of oxides is introduced thereinto in the desired concentration, and the whole subjected to the polymerizing conditions hereinabove described.

When the polymerization reaction is complete, as indicated by the absence of unreacted alkene oxides, the reaction products are subjected to a treatment which comprises the removal of the catalyst. The reaction products are cooled and mixed with a quantity of water, for example, an amount equal in volume to that of the reaction products. The mixture is acidified with a suitable acid-reacting substance, such as sulfuric or acetic acid, to neutralize the catalyst. A suitable solvent, such as petroleum ether, may be added to extract the organic material, the raffinate, or water layer being discarded. The extract is washed several times with water, the washings being discarded each time, until the polymer is essentially ash-free and neutral, following which the solvent, if present, is removed in a suitable manner, such as blowing with nitrogen while heating. The solvent-free residue may be subjected to vacuum distillation conditions to remove any light ends which are present usually only in small amounts.

The present invention contemplates the preparation of $C_3$ and $C_5$ alkene oxide polymeric mixtures capable of being used as synthetic lubricating oils, for example as crankcase lubricants. The synthetic oils of the present invention have good viscosity index, show improved hydrocarbon oil solubility as compared with similar materials hitherto prepared and have high thermal stability, as a result of which improved lubrication of metallic parts is obtained.

The viscosity of the polymeric materials herein contemplated may vary over the viscosity range characterizing mineral lubricating oils, for example, from about 40 SSU at 210° F. to about 170 SSU at 210° F. and somewhat greater or lesser. In the preparation of polymers with viscosities greater than about 115 SSU at 210° F. a diluent is advantageously used, in which case products with viscosities of about 170 SSU and somewhat higher at 210° F. can readily be prepared.

Viscosity of the final materials depends on average molecular weight of the polymeric mixture, which in turn depends on mol ratio of oxides to the alcohol reaction-initiating substance, as well as the molecular weight of the alcohol selected to initiate the polymerization reaction.

In general, the average molecular weight of my polymeric materials resides within a range of about 500 to about 2000 and higher; and the mol ratio of oxides to alcohol, from as low as 8, preferably 15, mols of oxides to as high as 200, preferably 150, mols of oxides to 1 mol of alcohol. A method of increasing the molecular weight is the carrying out of the reaction in a plurality of stages. That is, upon completion of the polymerization reaction, the resulting polymer, together with fresh catalyst may be charged to the reaction zone, heated to polymerization temperatures and additional oxides introduced therein. The whole is then subjected to polymerization conditions, which further reaction is effected to produce a polymeric mixture of higher molecular weight.

The average molecular weight of the polymeric mixture increases as the mol ratio of oxides to alcohol increases. Based on this principle, average molecular weight of the polymeric mixture may be obtained from the curve resulting from plotting molecular weight as a function of the mol ratio of oxides to alcohol. Viscosity, in turn, being a function of molecular weight, may be obtained from the curve resulting from plotting molecular weight against viscosity or against mol ratio of oxides to alcohol. Similarly, given the same mol ratio of oxides to alcohol, the increase in viscosity due to the use of an alcohol of increasing molecular weight may be obtained, particularly if the average molecular weight of the product is low. As the molecular weight of the product increases due to increasing ratio of oxides to alcohol, an increase in molecular weight of the alcohol, due to its smaller percentage contribution to the molecular weight of the various polymeric chains, produces an ever-decreasing effect on viscosity. For example, at a mol ratio of oxide to alcohol of only 20 to 1, no substantial change in viscosity was noticed in substituting 2-ethyl hexanol for methanol, a greater than three-fold increase in molecular weight of the alcohol.

Oil miscibility of the polymeric mixtures are effected by change in the concentrations of the $C_3$ and $C_5$ oxides, the alcohol used to initiate the polymerization reaction, and the average molecular weight of the polymeric mixture. As the proportion of the $C_5$ oxides in the $C_5$—$C_3$ alkene oxide mixture increases, lower miscibility temperatures are obtained. Increase in the molecular weight of the alcohol decreases oil miscibility temperature.

The properties desired in the copolymers herein described may be further enhanced, and new properties imparted thereto by the reaction of the hydroxyl groups appearing in the copolymer with known hydroxyl-reacting agents. For example, these hydroxyl groups may be subjected to known esterifying or etherifying conditions in the presence of esterifying or etherifying agents to produce ester- and ether-capped copolymers. Examples of ether-capping materials are diethyl sulfate or dimethyl sulfate, diazomethane, ethyl chloride (with alkali), thallous ethylate and an alkyl halide, etc. Among the ester-capping materials may be mentioned inorganic acid-reacting materials, such as the inorganic acids; organo-substituted inorganic acids; organic acid-reacting materials, such as the acyl halides, for example, acetyl chloride; and aliphatic acids, such as stearic acid, and acetic acid; acid anhydrides, such as acetic anhydrides, etc.

The following examples are illustrative of the invention, but are not to be construed as limiting the invention thereto.

*Example 1*

A mixture of 22.2 g. butanol and 1.1 g. sodium methylate was charged to an autoclave equipped with means of heating and agitation. After removal of the air from the autoclave by displacement with nitrogen, the autoclave and its contents were heated to 240° F. A reservoir containing propene oxide and 1,2-epoxypentane in a mole ratio of 3:1 delivered oxides to the autoclave until the pressure therein was 30 p. s. i. The reaction conditions were held constant until all the oxides had reacted. The product weighed 236 g., representing a mole ratio of oxides to alcohol of 12. It was then worked up by neutralizing the alkali with acetic acid, then water-washing the oil phase three times. The oil phase was stripped at 3 mm. Hg to a maximum pot temperature of 300° F. to remove light ends, which amounted to 4 g. The residue weighed 218 g. It was filtered, and analyzed as follows:

| | |
|---|---|
| Viscosity at 100° F | 138.5 SSU |
| Viscosity at 210° F | 44.4 SSU |
| Viscosity index | 136 |
| Solubility of water in polymer | Between 1 and 2% |
| Oil miscibility temperature | 20° F. |
| Hydroxyl number | 90 |
| Molecular weight (cryoscopic in benzene) | 565 |

1,2-epoxypentane is a new compound not described in the literature. It was prepared by dehydrochlorination of 1-pentane chlorohydrin, following the procedure of Lucas, Schlatter and Jones (J. Amer. Chem. Soc. 63, 25 (1941)) for the preparation of 2,3-epoxypentane via the chlorohydrin. The fraction boiling at 198° F. was found to analyze 15.4 per cent oxirane oxygen by the method of Swern et al. (Anal. Chem. 19, 414 (1947)), with the theoretical value being 18.6 per cent. The freezing curve showed that the purity was much greater than the above determination indicated, being over 95 per cent. The properties are listed below:

| | |
|---|---|
| Molecular weight (cryoscopic in benzene) (theoretical 86.1) | 84 |
| Boiling point/760 mm. Hg | 198° F. |
| Freezing point | −130° F. (−90.0° C.) |
| Refractive Index $n_D^{20}$ | 1.3976 |
| Density $d^{20}$ | 0.8343 g./ml. |
| Molecular Refraction (calculated value=24.98, using the value of 1.890 for oxirane oxygen as proposed by Flores-Gallando and Pollard (J. Org. Chem., 12 831 (1947)) | 24.90 |

*Example 2*

A run was made using ingredients and procedure identical with those of Example 1 except that the mole ratio of propene oxide to 1,2-epoxypentane was 65:35. After a short time, no further absorption of oxides occurred, indicating that the reaction could not be carried to completion. The bulk of the oxides remained unreacted, and the small amount of condensate present was unsuitable for use as a lubricant.

*Example 3*

A copolymer was prepared using ingredients and procedure identical with those of Example 1 except that an equivalent amount of sodium hydroxide replaced the sodium methylate. The product obtained had essentially the same characteristics as the polymer prepared as described in Example 1.

*Example 4*

To 42 g. of "iso-octyl" alcohol was added 0.5 g. sodium and the mixture heated until solution of the sodium was complete. The resulting solution was charged to an autoclave. The same procedure was then applied as in Example 1. The product had a viscosity of 52.0 SSU at 210° F., and had an oil miscibility temperature of 45° F.

*Example 5*

A copolymer was prepared essentially as in Example 4 except that 3-methyl-1,2-epoxybutane was used in place of 1,2-epoxypentane. The product obtained was useful as a synthetic lubricant.

*Example 6*

A copolymer was prepared essentially as in Example 4 except that 10 mole per cent 2,3-epoxypentane was used in place of 30 mole per cent 1,2-epoxypentane. Polymerization was slow and incomplete when the 2,3-epoxypentane content was increased above about 15 mole per cent. Similar results were obtained with 2-methyl-1,2-epoxybutane replaced the 2,3-epoxypentane.

*Example 7*

A copolymer was prepared essentially as in Example 4, using the following proportion of monomers: 70 mole per cent propene oxide, 25 mole per cent 1,2-epoxypentane and 5 mole per cent 2,3-epoxypentane. The product was useful as a synthetic lubricant.

*Example 8*

A mixture of 45 g. of 2-ethylhexanol and 1.1 g. of sodium methylate was charged to an autoclave equipped with means of heating and agitation. The air was removed from the autoclave by dispelling with nitrogen, after which the autoclave and contents were heated to a temperature of 250° F. A reservoir containing approximately 450 g. of a mixture of oxides containing 70 mol per cent 1,2-epoxypropane, 20 mol per cent 1,2-epoxypentane, 2½ mol per cent 2,3-epoxypentane, 2½ mol per cent 2-methyl-1,2-epoxybutane, and 5 mol per cent 1,2-epoxycyclopentane was allowed to deliver the oxides to the autoclave until the pressure therein was 30 pounds per square inch, and sufficient oxide material had been introduced to give a mol ratio of oxides to alcohol of 20. After reaction of the oxides, the reaction mixture was removed from the autoclave, the yield being 488 g. The crude reaction mixture was neutralized and washed, about 450 g. of purified product being obtained. This product had a viscosity of 55 SSU (Saybolt seconds Universal) at 210° F., a viscosity index of 135, and an oil miscibility temperature of about 50° F.

*Example 9*

A similar copolymerization to that described in Example 8 was attempted. In this case the oxide mixture contained 65 mol per cent 1,2-epoxypropane, 20 mol per cent 1,2-epoxypentane, 5 mol per cent 2,3-epoxypentane, 5 mol per cent 2-methyl-1,2-epoxybutane, and 5 mol per cent 1,2-epoxycyclopentane. Polymerization could not be completed and the bulk of the oxides remained unreacted.

*Example 10*

To 25 g. of butanol there was added 0.5 g. of metallic sodium and the mixture heated until solution of sodium was complete. The resulting material was charged to an autoclave equipped with means for heating and agitation. The air in the autoclave was removed by displacement with nitrogen, after which the autoclave was heated to a temperature of about 250° F. A reservoir containing about 304 g. 1,2-epoxypropane, 29 g. 1,2-epoxypentane, 29 g. 3-methyl-1,2-epoxypentane, 22 g. 1,2-epoxycyclopentane, 17 g. 2,3-epoxypentane, and 17 g. 2-methyl-1,2-epoxybutane, representing about 80 mol per cent, 5 mol per cent, 5 mol per cent, 4 mol per cent, 3 mol per cent and 3 mol percent of each oxide, respectively, and an oxide to alcohol ratio of 20 to 1, was opened to the autoclave and the oxides introduced thereinto until the pressure was 40 p. s. i. (pounds per square inch gauge). The temperature of the mixture was maintained at about 250° F. and the pressure between about 20 p. s. i. and 40 p. s. i. After all the oxides had been added, the autoclave was disassembled. The contents were diluted with water, neutralized with acetic acid, and the mixture extracted with petroleum ether. The petroleum ether layer was washed several times with water, then dried and the petroleum ether removed. The resulting product was suitable as a synthetic lubricant. It had a viscosity of 53 SSU at 210° F., a viscosity index of 140, and an oil miscibility temperature of 45° F.

I claim:

1. Process of preparing polymeric materials useful as synthetic lubricants, which comprises subjecting to polymerization temperatures and pressures in the presence of an alkaline catalyst, an aliphatic monohydroxy alcohol effective to initiate the polymerization reaction, about 70 to 90 mol per cent propene oxide, and about 10 to 30 mol per cent pentene oxides, of which pentene oxides not more than about 5 mol per cent, and 15 mol per cent, based on the total propene-pentene oxide content, is, respectively, 2-methyl-2,3-epoxybutane, and material selected from the group consisting of 2,3-epoxypentane, 2-methyl-1,2-epoxybutane and 1,2-epoxycyclopentane, said catalyst being present in an amount expressed by the ratio of about 1 mol of said alkaline catalyst to about 700 to 100 mols of said propene oxide and pentene oxides, and said alcohol being present in an amount of about 1 mol to about 8 to 200 mols of the propene-pentene oxide content.

2. Process substantially as described in claim 1, wherein the catalyst is present in an amount based on mol ratio of propene and pentene oxides to catalyst, ranging from about 200 to 400 to 1.

3. Process substantially as described in claim 1, wherein the alcohol is present in an amount of about 1 mol to about 15 to 150 mols of the propene-pentene oxide content.

4. Process substantially as described in claim 1, wherein the monohydroxy alcohol is an aliphatic monohydroxy alcohol of 1 to about 10 carbon atoms.

References Cited in the file of this patent
UNITED STATES PATENTS

| Number | Name | Date |
|---|---|---|
| 1,633,927 | Davidson | June 28, 1927 |
| 1,922,459 | Schmidt et al. | Aug. 15, 1933 |
| 2,510,540 | Ballard et al. | June 6, 1950 |
| 2,520,611 | Roberts et al. | Aug. 29, 1950 |
| 2,522,155 | Ballard et al. | Sept. 12, 1950 |